UNITED STATES PATENT OFFICE.

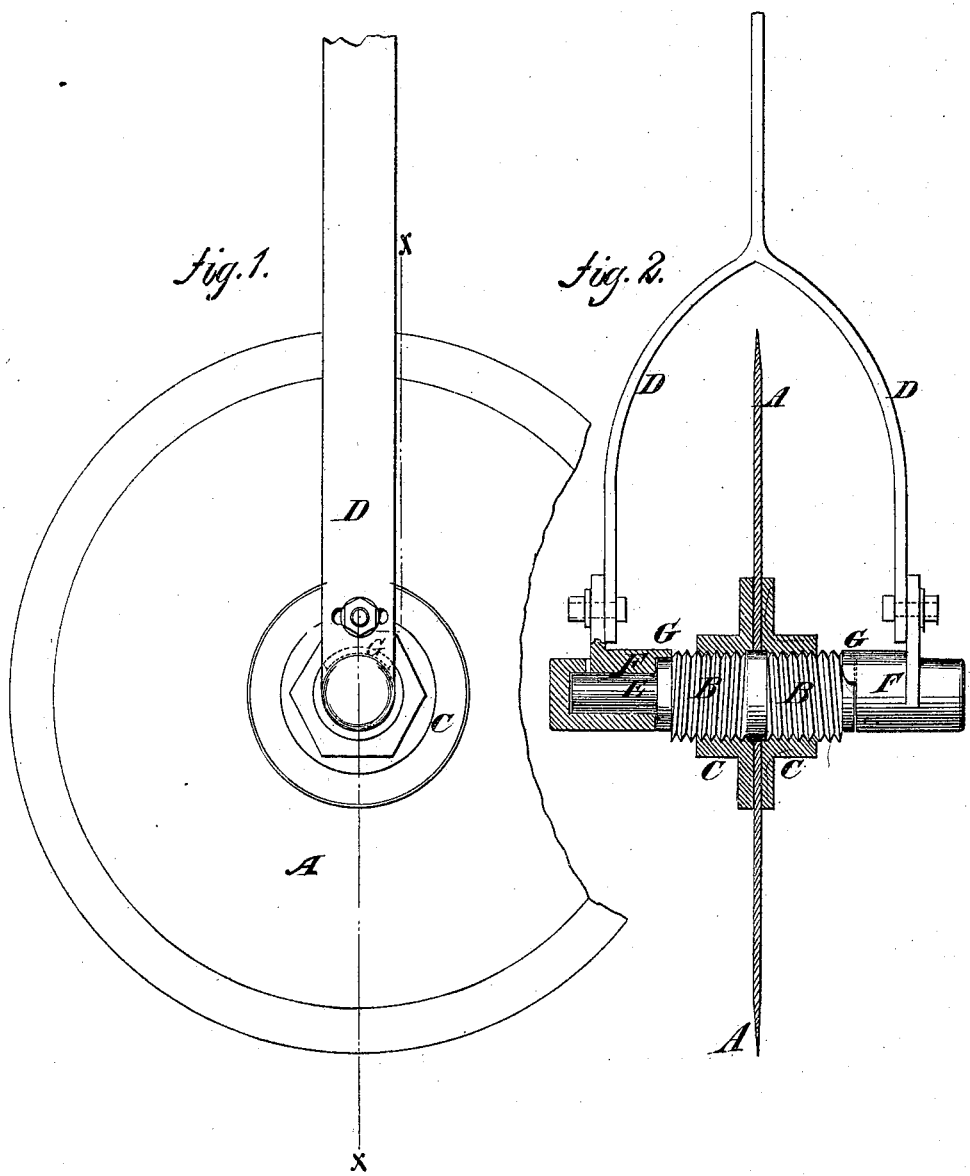

KINYON W. MANWARING, OF COUNCIL BLUFFS, IOWA.

IMPROVEMENT IN COLTERS.

Specification forming part of Letters Patent No. 174,736, dated March 14, 1876; application filed January 22, 1876.

*To all whom it may concern:*

Be it known that I, KINYON W. MANWARING, of Council Bluffs, Pottawattamie county, Iowa, have invented a new and Improved Rolling Colter, of which the following is a specification:

My invention consists in mounting the colter, between two right and left nut-collars, on a shaft which revolves on end bearings in the yoke which attaches the colter to the plow. The objects are to adjust the colter along the shaft readily for wide or narrow cuts, and to arrange the bearings so as to withstand wear and exclude the dust better than when the colter revolves on a stationary shaft, as commonly arranged. In the common arrangement the yoke has to be shifted on the plow-beam to vary the colter for varying the width of the cuts, which involves more expensive construction than this plan, and the contrivance is more difficult to adjust.

Figure 1 is a side elevation, and Fig. 2 is a sectional elevation, of my improved roller-colter contrivance.

Similar letters of reference indicate corresponding parts.

A is the colter; B, the shaft; C, the screw-collar, and D the yoke by which the colter is attached to the plow-beam. The shaft has a right and left screw-thread for screwing the collars up to both sides of the colter, and adjusting along the shaft either way. The journals E of the shaft extend into bearings F attached to the lower ends of the yoke, and having caps G extending along the shaft from the shoulder to exclude the dust from the bearings.

Having thus described my invention, I claim as new and desire to secure by Letters Patent—

The combination, with roller colter A, of right and left screw-shaft B, screw-collars C, and yoke D, arranged substantially as and for the purpose specified.

KINYON W. MANWARING.

Witnesses:
D. G. SPOONER,
J. P. CASADY.